United States Patent [19]

Jung

[11] Patent Number: 4,808,818

[45] Date of Patent: Feb. 28, 1989

[54] METHOD OF OPERATING A MASS SPECTROMETER AND A MASS SPECTROMETER FOR CARRYING OUT THE METHOD

[75] Inventor: Gerhard Jung, Delmenhorst, Fed. Rep. of Germany

[73] Assignee: Finnigan MAT GmbH, Bremen, Fed. Rep. of Germany

[21] Appl. No.: 40,902

[22] Filed: Apr. 21, 1987

[30] Foreign Application Priority Data

Apr. 23, 1986 [DE] Fed. Rep. of Germany ....... 3613768

[51] Int. Cl.[4] .............................................. B01D 59/44

[52] U.S. Cl. ............................... 250/282; 250/252.1 R

[58] Field of Search ............... 250/281, 282, 294, 295, 250/296, 298, 299, 300, 252.1 R

[56] References Cited.

U.S. PATENT DOCUMENTS 4,110,613 8/1978 Hickam ............................... 250/282

4,164,652 8/1979 Wollnik ............................... 250/282

FOREIGN PATENT DOCUMENTS 0041583 3/1977 Japan .................................. 250/281

*Primary Examiner*—Bruce C. Anderson

*Assistant Examiner*—Paul A. Guss

*Attorney, Agent, or Firm*—Flehr, Hohbach, Test, Albritton & Herbert

[57] ABSTRACT

A method is described for operating a mass spectrometer with a location-resolving detector. In this case, when an ion impinges on the detector, the instantaneous parameters of the analyzer are read and compared with a calibration table, and the instantaneous mass value (to be expected) is determined therefrom in the center of the detector. The location signal of the detector indicates the impingement location of the recorded event and is converted, via a second calibration table, into the deviation of the actual mass from the mean mass. The exact (actual) mass value is calculated from both values. This value is recorded in a memory of a computer.

7 Claims, 4 Drawing Sheets

METHOD OF OPERATING A MASS SPECTROMETER AND A MASS SPECTROMETER FOR CARRYING OUT THE METHOD

DESCRIPTION

The invention relates to a method in accordance with the preamble of the main claim and to a device for carrying out the method.

The mass spectrometer which is used here produces a mass dispersion, i.e. ions of various masses impinge on the detector at various locations at a specific moment in time (in contrast with, for example, the flight time mass spectrometer or the quadrupole mass filter). In the simplest case, the analyser includes a sector magnet and, in the case of a double-focussing system, the analyser includes a sector magnet and an electrostatic sector. However, this method can also be employed with complex analysers, provided that there is mass dispersion at the detector.

Several different methods are known for the operation of magnetic mass spectrometers. Thus, for example, the spectrum may be guided past a narrow outlet slit utilising systematic adjustment (scanning) of the sector magnet. The variations in intensity behind the outlet slit then produce the spectrum (in a time sequence).

In the case of double-focussing mass spectrometers, however, other scans are also used in practice, e.g. electric scans (the energy of the ions and/or the field strength of the electric field are adjusted) and combinations of these scans, so-called "linked scans".

Various analyser parameters (e.g. magnetic field strength, acceleration voltage and electric field strength) are thereby systematically changed.

In the case of a spectrograph, however, the entire spectrum is simultaneously recorded, e.g. on a photographic plate. In this case, however, accurate counting operations and subsequent processing of the information by means of a computer are not possible. It was proposed to use a location-resolving detector, e.g. a so-called channel plate, instead of the photographic plate, so that, on the one hand, an entire portion of a spectrum can be recorded simultaneously, but, on the other hand, an electronic evaluation of the results is possible. A particular method of evaluating the results of measurement is described in U.S. Pat. No. 4,164,652 which seeks to permit a better and more accurate evaluation of the recorded spectra without the varying sensitivities of individual recording elements (channels) causing inaccuracies in the result of measurement. In particular, the spectrum is recorded for a certain length of time (analogue recording or counting of the results) and then read as a whole and stored. Thereafter, the arrangement is displaced by an amount corresponding to a channel and read once more, the result then being added thereto when displaced by one memory position. In each case, therefore, it is necessary to defer the recording of at least one complete portion of a spectrum until the new result of measurement passes into the memory.

The Abstract associated with Japanese Patent Specification No. 58-154 155 (A) discloses a device and method of the initially described type. In this case, however, a plurality of results is integrated for each portion of a spectrum, so that the scanning speed is limited.

On the basis of the above-mentioned prior art, an object of the present invention is to develop the known method so that there is no need to record a portion of a spectrum for a specific time, and consequently the detector can be used even at high scanning speeds (e.g. one sec/decade).

The present invention permits an electronic recording of the mass spectrum to be effected so that the data can be further processed subsequently. The only difference for the user between employing the present method (i.e. using the device associated therewith) and utilising a slit detector resides in the fact that the sensitivity of the mass analysis is greatly increased since recording is effected practically simultaneously with a plurality of slits.

In consequence, the essential feature of the present invention is that the mass analyser is controlled in the scanning operation, and each individual ion, which impinges on the detector from a partial region of the mass spectrum, is recorded for analysis. Accordingly, the instantaneous mass value ($m_O$) associated with a definite location (e.g. the value at the centre) is determined from the instantaneous values of the analyser parameters. Simultaneously therewith, the relative mass deviation ($\Delta m/m_O$) of the detected ion is determined from the detector signal, and the actual mass of the ion ($m=m_O+m_O x\ (\Delta m/m_O)$) is calculated from these two values by means of a high-speed processor and stored.

Storage may be effected in such a manner that the content of the memory address associated with the mass is incremented, or it is even effected in such a manner that the mass value itself is recorded for further processing subsequently. All this occurs before the next ion impinges on the detector.

Consequently, each individual result is recorded and, after processing, it is assigned to the correct memory address which already contains the previously counted results. This is possible because the instantaneous value of the magnetic field is determined by magnetic scanning, for example, and the instantaneous mass value (to be expected) is derived from this evaluation, the mass value belonging to a definite location on the detector, preferably at the centre of the detector. In consequence, the behaviour with respect to time of the field strength of the sector magnet does not play any part as long as the field strength is known. The field strength can be measured directly with an appropriate sensor, and the current flowing through the sector magnet can be measured, or the field strength can be derived from the (prescribed) behaviour with respect to time. Static measurements are, of course, also possible (a fixed magnetic field).

It is advantageous, particularly in the static operation, whilst the spectrum is being picked-up, for the memory content to be indicated at the same time (simultaneously), so that the result of measurement can be constantly observed. In this case, it is possible both to indicate the memory content as an absolute value so that the growth in the frequency distribution (on a linear or logarithmic scale) can be observed, and to indicate the memory content standardised to the sum of the individual events, so that the relative mass distribution can be detected more clearly.

In another preferred embodiment of the method, a high-voltage potential which accelerates the ions to be analysed is applied to the detector, that is to say, a positive or negative potential for negative or positive ions respectively. The potential may be up to 20 kV relative to mass. The signals are then brought to mass potential at a suitable location, via high-voltage capacitors, for example.

In another preferred embodiment of the method, the ions in a partial region of the mass spectrum to be investigated are deflected by means of an electric field within one scanning operation in such a manner that they impinge on a slotted screen with a (non-location-resolving) detector therebehind, and the mass of the ion to be analysed is determined from this detector signal and from the instantaneous values of the analyser parameters. In this version of the method, therefore, two different detectors are employed, and the detector which is disposed behind the slotted screen may be of a particularly sensitive construction. The deflection may be effected in an X- or Y-direction, but it is preferably effected in a Y-direction.

In another embodiment of the method, the simultaneous detector (channel plate) is dynamically operated, whereby the analyser is moved during the scanning operation and, at the same time, a portion of the spectrum is simultaneously measured. In this manner, the location-resolving means of the detector is used only to investigate a partial region, while only one group of memory addresses is associated with the detector. By simultaneously including the analyser parameters in the calculation of the association of events, any trend with respect to time of the analyser parameters is fundamentally possible. In consequence, scanning may be effected continuously or also stepwise.

A mass spectrometer as described below is suitable for carrying out the method. In such a case, it is essential that the computer is a sufficiently high-speed computer, since on-line operations are effected, that is to say, the computer collects the data during the scanning operation, calculates the mean mass and mass deviation, and has to store the result of the calculation. It is advantageous for calibration tables to be used here in order to calculate the instantaneous mass value from the instantaneous value of the analyser parameters and to derive, from the location at which the particle impinges on the detector, the deviation from this mean mass. The actual, exact mass value can easily be calculated from these two values, so that it can then be stored (to increment the corresponding memory content).

Additional details which are essential to the invention are described more fully hereinafter with reference to embodiments which are illustrated by drawings. In the drawings.

Figure 1:
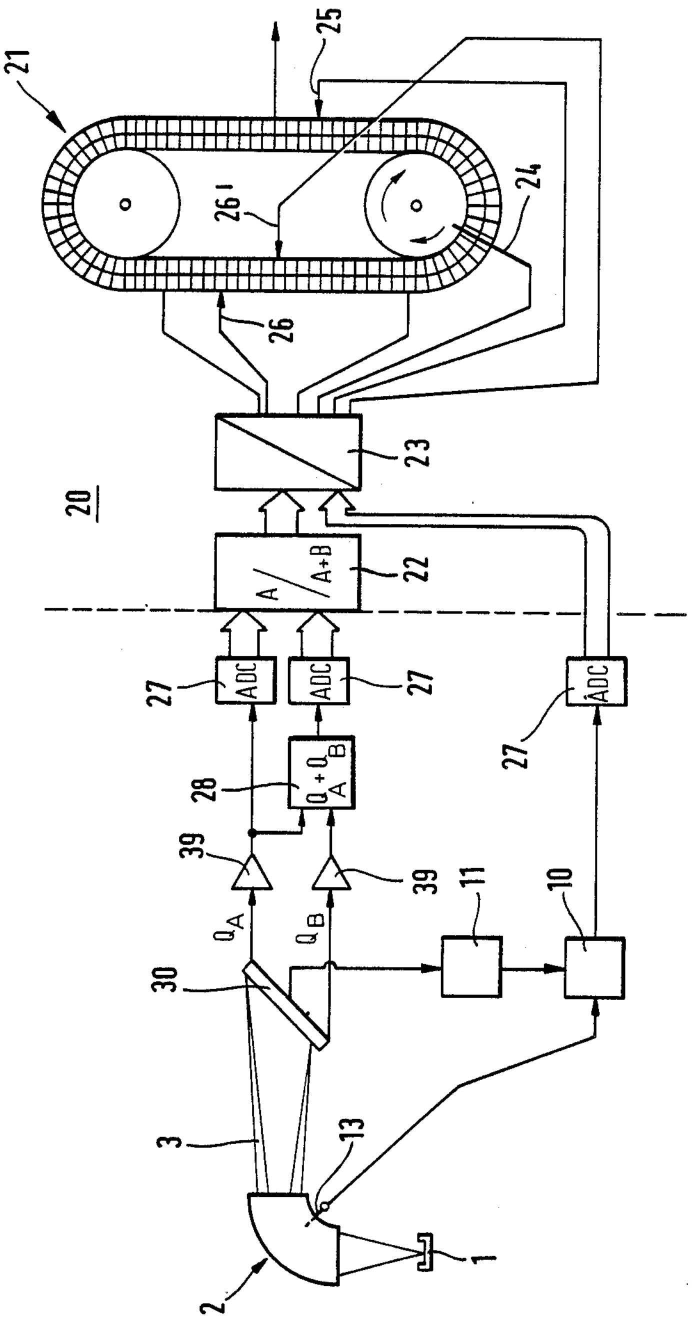
FIG. 1 is a basic view (circuit diagram) of a device for carrying out the method.

FIG. 1 illustrates a (conventional ion source 1 from which a beam of ions enters a sector magnet 2. The ion beam 3 emerges (focussed) from the sector magnet 2, which is of a conventional construction and is supplied with current, and the ion beam 3 impinges on a location-resolving detector 30. The detector 30 is connected by its output lines QA and QB to input amplifiers 39, the output levels of which are added in a summation circuit 28. The summed value is converted into a digital word by an analogue/digital converter 27 and fed to a computer 20. In addition, the output of one input amplifier 39 for the output voltage QA of the detector 30 is also converted into a digital word by an analogue/digital converter 27 and fed to the computer 20. In computer 20, the value A/(A+B) is formed from these two digital words in block 22, and this value corresponds to the location value, i.e. to a value which is proportional to the impingement location of the ion.

The location value thus obtained is processed further in block 23 of computer 20 to provide the relative mass deviation, $\Delta m/m_O$.

A field strength sensor 13 is disposed at a suitable location in the sector magnet 2, and the output signal of the sensor 13 is proportional to the magnetic field prevailing in the sector magnet 2, i.e. it is proportional to its field strength. Instead of using a field strength sensor 13, it is also possible, of course, for the current feeding the sector magnet 2 to be measured, since the field strength is proportional to the current. The output signal of the field strength sensor 13 passes to an input of a circuit 10. An additional input of the circuit 10 is connected to the location-resolving detector 30 via a trigger circuit 11. The circuit 11 is so adapted that, when an ion impinges on the detector 30, a trigger signal appears at the output of circuit 11. This trigger signal causes the circuit 10 to scan the value present at the output of the field strength sensor 13 and to feed it to computer 20, via an additional analogue/digital converter 27, as an instantaneous field strength signal $B_t$. In computer 20, the signal $B_t$ (or respectively the corresponding digital word) is converted, in the block 23, into the value $m_0$, i.e. into the instantaneous mass value which is to be expected in the centre of the detector 30 according to the field strength in the sector magnet 2. To effect this, a calibration table is stored in block 23, and an instantaneous mass value is associated with each field strength value by means of this table.

In block 23, an offset address which corresponds to the mass deviation $(\Delta m/m_O)\times m_O=\Delta m$ is also calculated from the value of the relative mass deviation $(\Delta m/m_O)$ and from the instantaneous mass value in the centre of the detector $(m_O)$. This offset address is added to an initial address which corresponds to the mean mass $m_O$, so that the memory address associated with the mass $m=m_O+\Delta m$ appears as the result. The initial address is obtained by way of an address counter 24 which is associated with a ring memory 21. In block 23, therefore, the actual mass value is associated with a memory address in memory 21, and the content of this memory address is incremented. This is indicated by arrow 26 in FIG. 1.

The ring memory 21 is so designed, however, that it is possible to store not only the number of ions detected in one memory cell, but also the instantaneous mean mass value (26). It is also possible here, of course, to store a scanning parameter which is clearly associated with the mass (e.g. the instantaneous magnetic field or the time interval after commencement of the scanning operation) instead of the mass value.

The address counter 24 operates in synchronism with the magnet control means.

FIG. 1 shows an exit arrow extending from the ring memory 21 to indicate that the subsequent processing of the memory contents occurs in exactly the same way as with hitherto conventional slit detectors, so this further processing does not need to be described in more detail. After the reading operation, the address which has been read is set to zero, as indicated by arrow 25.

Consequently, it follows from this description that the address counter of the ring memory operates at the same high speed at which the masses pass along the detector, so that each event (impingement of an ion) can be separately recorded.

Figure 2:
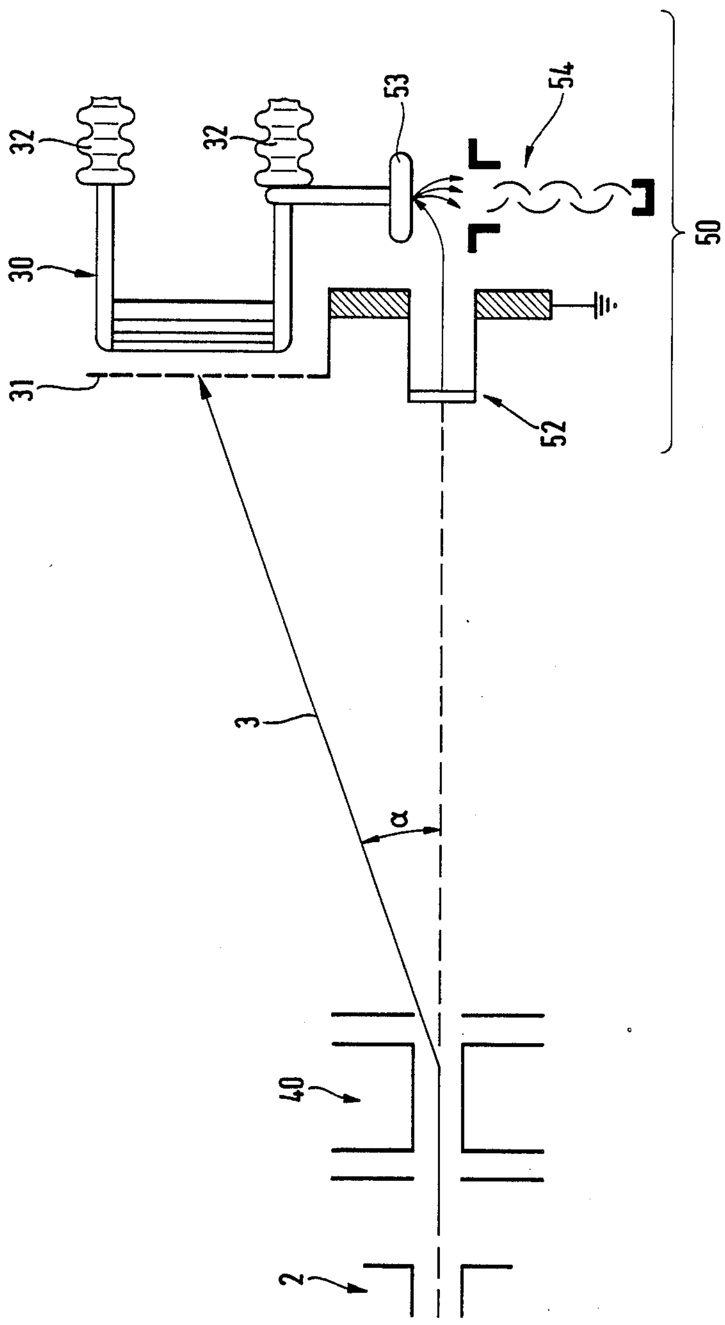
FIG. 2 shows a detail of the arrangement in FIG. 1 with a further modification.

FIG. 2 is a more detailed illustration of another preferred embodiment of the invention, where there is the possibility of analysing a partial region of the spectrum to be detected by the arrangement shown in FIG. 1, while another partial region of the spectrum is being analysed by an additional detector 50. In this arrangement, a capacitor arrangement 40 (field plates) is connected downstream of the sector magnet 2 in such a manner that, when the capacitor arrangement 40 is supplied with an appropriate voltage, the ion beam 3 is deflected by an angle $\alpha$ and guided onto the above-described, location-resolving detector 30. However, when the capacitor arrangement 40 is not supplied with voltage, the ion beam 3 impinges on a conversion dynode 53 via a slit arrangement 52, electrons ($e^-$) being produced at the dynode 53. The electrons pass into a secondary electron multiplier 54 and produce an appropriate signal which is fed to the computer 20 simultaneously with the signal $B_t$, which is proportional to the field strength. The mass of the detected ion is then determined from these two signals in the computer 20.

Figure 3:
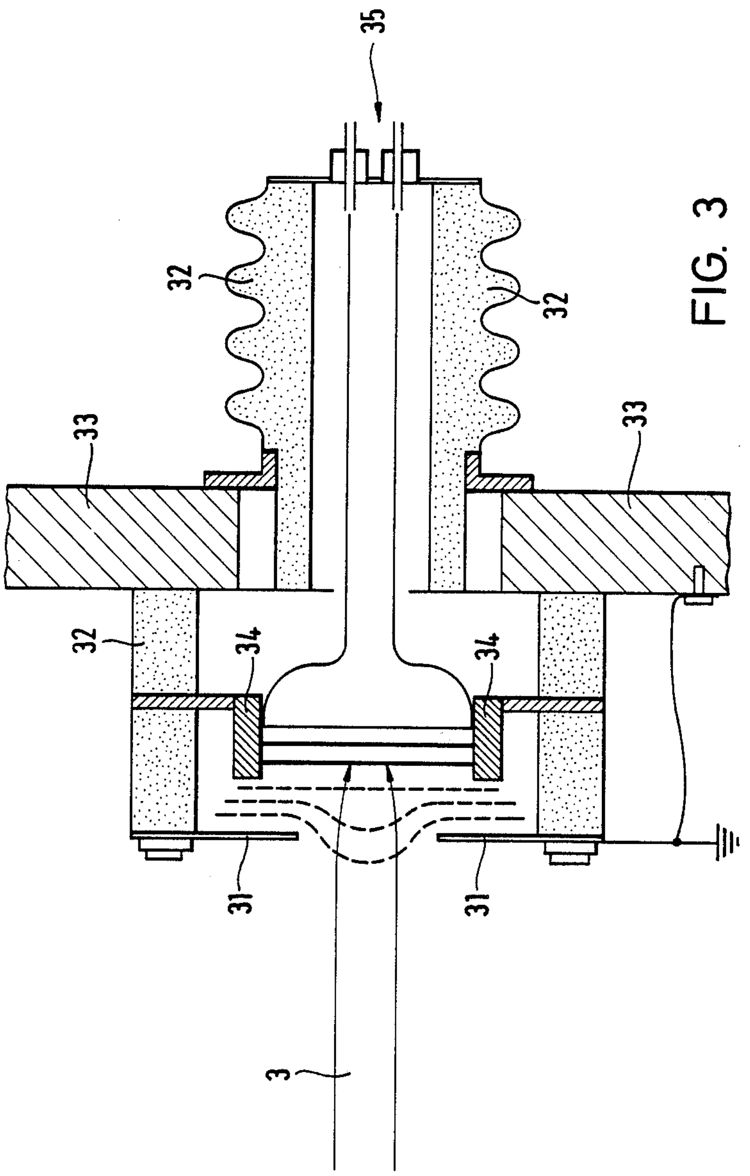
FIG. 3 is a schematic view of a preferred embodiment of the location-resolving detector of FIGS. 1 and 2.
Figure 4:
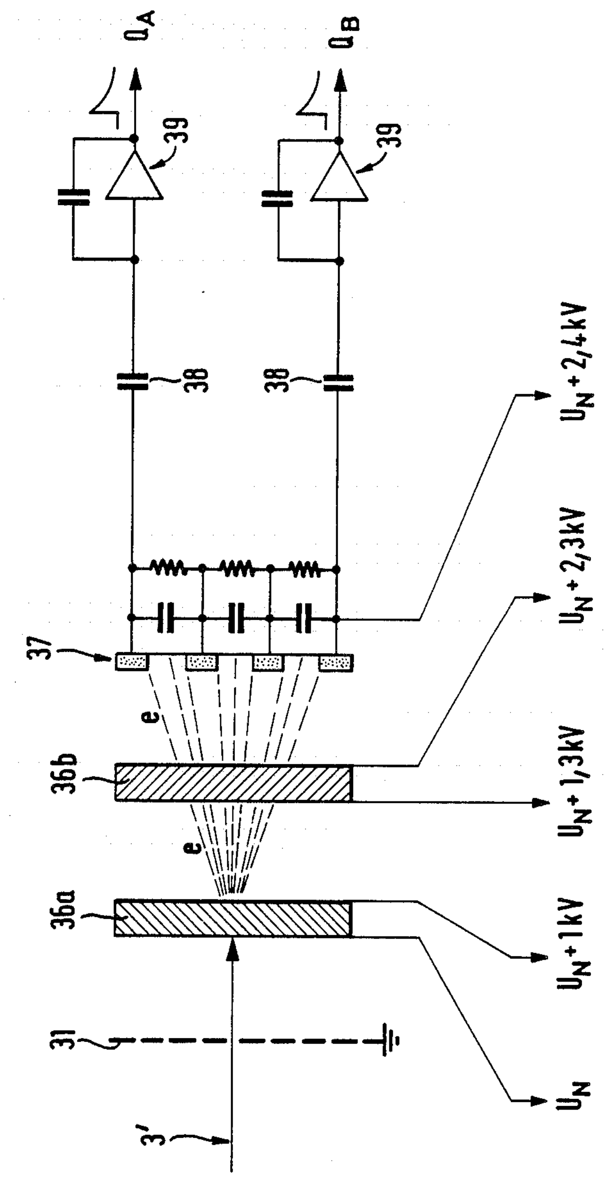
FIG. 4 is a basic view of the detector shown in FIG. 3.

The construction of the position-sensitive detector is described more fully hereinafter with reference to FIGS. 2 to 4. The actual detector comprises one or more channel plates 36*a* and 36*b* which lie one behind the other, a lattice-type screen or slotted screen 31 being disposed in front of the channel plates and a strip anode 37 being disposed behind the channel plates. The channel plates and the strip anode are mounted in a detector frame 34 (FIG. 3) and secured to the vacuum chamber wall 33 via the intermediary of insulators 32. The channel plates 36*a* and 36*b* are supplied on their surfaces with a voltage which increases in the direction of the strip anodes 37, whereby the total arrangement can additionally also be charged at a potential which corresponds to the ions to be detected in order to accelerate the ions.

However, as soon as an individual ion 3' (FIG. 4) passes through the grid 31 onto the first channel plate 36a, electrons are released from this plate and accelerated, and they impinge on the next channel plate 36*b* from which, in turn, electrons are released. These electrons impinge on the strip anode 37 and generate thereon a charge whose distribution (centre of mass) is determined by the location at which the ion 3' impinges on the first channel plate 36*a*.

The individual strips of the strip anode 37 are interconnected with one another by means of parallel connections of resistors and capacitors. The first and last strips of the strip anode 37 are contacted by connection lines and guided on isolating capacitors 38, input amplifiers 39 being connected at the output end of the capacitors 38. Two signals $Q_A$ and $Q_B$ appear at the output of the input amplifiers 39, the signals being added together via the blocks 28 which are shown in FIG. 1, being changed into digital values and being converted into the location value X (block 22) according to the formula $X=Q_A/(Q_A+Q_B)$, which value can vary between zero and one. The location value X thus obtained is further processed in the manner described above.

I claim:

1. A method of operating a mass spectrometer with a location-resolving detector sensitive to the impingement of ions, a controllable mass analyzer and a computer with a memory, the mass analyzer being controlled in a scanning operation over a mass spectrum and at least one partial region of the mass spectrum to be investigated being recorded for analysis by the location-resolving detector, the method comprising the steps of:

(a) determining an instantaneous mass value, $m_0$, associated with a center location of said detector, from instantaneous scanning parameters of said analyzer when a said ion impinges on said detector;

(b) determining from a signal from said detector the impingement location of said ion on said detector and from said impingement location the relative mass deviation, $\Delta m/m_O$, of the mass of said ion from said mass value, $m_O$;

(c) calculating immediately after the above two steps the mass value, m, of said ion by:

$$m=m_O+(\Delta m/m_O \times m_O).$$

2. A method according to claim 1, wherein the mass analyzer includes a sector magnet, characterized in that the instantaneous values of the magnetic field ($B_t$) and of the coil current ($I_t$) are said parameters used for determining said instantaneous mass value, $m_0$.

3. A method according to claim 2, wherein the mass analyzer includes a combination of at least one magnetic sector field and at least one electric sector field, characterized in that logical combinations of the instantaneous values of the magnetic field, of the coil current of said magnetic sector field, of the electric field strength of said electric sector field, of the ion energies in said sector fields and of the time after commencement of the scanning operation are used as said scanning parameters.

4. A method according to claim 1, including an addressable memory, characterized in that memory addresses of said memory, the contents of which are incremented upon detection of an ion having a mass corresponding to a predetermined address, are each associated with predetermined mass intervals.

5. A method according to claim 4 characterized in that the contents of the memory addresses are continuously incremented in the sequence in which the various masses occur in said scanning operation.

6. A method as in claim 5 including the step of operating an address counter for said addressable memory in synchronization with said scanning operation.

7. A method as in claim 1 where said mass value, m, corresponds to an address in a memory whose contents are incremented to reflect said impingement of said ion.

* * * * *